(12) United States Patent
Liu et al.

(10) Patent No.: US 7,357,319 B1
(45) Date of Patent: Apr. 15, 2008

(54) EXTERNAL ADAPTER FOR MAGNETIC STRIPE CARD READER

(75) Inventors: Li Liu, Milpitas, CA (US); Mohammad A. Khan, San Jose, CA (US); Jorge M. Fernandes, Los Altos Hills, CA (US); Ahmer Ali Khan, La Jolla, CA (US); Anna C. Stockel, San Jose, CA (US)

(73) Assignee: VIVOtech, Inc., Santa Clara, CA (US)

( * ) Notice: Subject to any disclaimer, the term of this patent is extended or adjusted under 35 U.S.C. 154(b) by 0 days.

(21) Appl. No.: 11/051,244

(22) Filed: Feb. 4, 2005

Related U.S. Application Data

(60) Provisional application No. 60/647,274, filed on Jan. 24, 2005.

(51) Int. Cl.
*G06K 7/08* (2006.01)
(52) U.S. Cl. ..................................... 235/449
(58) Field of Classification Search .............. 235/449
See application file for complete search history.

(56) References Cited

U.S. PATENT DOCUMENTS

| | | | |
|---|---|---|---|
| 5,850,077 A | | 12/1998 | Tognazzini |
| 5,933,812 A | * | 8/1999 | Meyer et al. ............... 705/15 |
| 5,991,410 A | | 11/1999 | Albert et al. |
| 6,009,350 A | * | 12/1999 | Renken .................. 607/32 |
| 6,206,293 B1 | | 3/2001 | Gutman et al. |
| 6,607,127 B2 | | 8/2003 | Wong |
| 6,769,607 B1 | | 8/2004 | Pitroda et al. |
| 2003/0218066 A1 | * | 11/2003 | Fernandes et al. .......... 235/449 |

OTHER PUBLICATIONS

Magnetic Stripe Glossary; Association for Automatic Identification and Mobility; downloaded on Apr. 20, 2004 at http://www.aimglobal.org/technologies/card/msglossary.htm.
Magentic Stripe Basics; Association for Automatic Identification and Mobility; downloaded on Apr. 20, 2004 at http://www.aimglobal.org/technologies/card/mbasics.htm.
Identification Cards- Recording technique Part 1: Embossing; International Standards; ISO/IEC 7811-1 2002.

* cited by examiner

*Primary Examiner*—Michael G. Lee
*Assistant Examiner*—Tae W. Kim
(74) *Attorney, Agent, or Firm*—Townsend and Townsend and Crew LLP

(57) ABSTRACT

An adaptor in accordance with the present invention allows a conventional magnetic stripe card POS reader to receive information from contact-based or wireless sources while maintaining the concurrent ability of the reader to interact with a magnetic stripe card. In accordance with one embodiment of the present invention, the adaptor includes an inductor capable of generating a magnetic field of sufficient power to couple with a head of a magnetic stripe card reader through the housing of the reader device. In this manner, the adaptor can be positioned external to the reader device, leaving the slot of the reader accessible for conventional interactions with magnetic stripe cards. Selective inductive communication with individual heads of the reader device may exploit their differing sensitivity to external magnetic fields generated by the adaptor.

4 Claims, 4 Drawing Sheets

EXTERNAL ADAPTER FOR MAGNETIC STRIPE CARD READER

CROSS-REFERENCE TO RELATED APPLICATION

The instant nonprovisional patent application claims priority from U.S. provisional patent application No. 60/647,274, filed Jan. 24, 2005, and incorporated by reference herein for all purposes.

BACKGROUND OF THE INVENTION

The concept of magnetic stripe credit cards was generally embraced by merchants and consumers when standards were adopted by the industry in the 1970's. The International Airline Transport Association (IATA) and the American Banking Association (ABA) defined the standards for magnetic domain encoding for tracks 1 and 2, respectively, of magnetic stripe cards. A third track of magnetic stripe cards is still used by some organizations such as ATM machines for read and write functions, and utilizes unique organization encoding schemes. The International Standards Organization (ISO/IEC 7811) established standards for the architectural design and acceptable materials composition of magnetic stripe cards.

Electronic/computer "RF proximity chip cards" introduced in the late 1980s were originally used for applications such as inventory control. ISO standards 15693 and 14443, sub type A and B, typically define such characteristics of RF proximity chip cards that include operational frequencies, electromagnetic coupling distance, and data integrity. These RF proximity chip cards have now increased in popularity for use with employee access to secure areas such as office buildings. The RF proximity chip cards typically receive power for on-card electronic functions via an induced electromagnetic field held within about 10 cm of the communications transceiver. Data is typically transferred to the on-card chip via electromagnetic sub-carriers and switching of the electromagnetic field.

The integrated circuits resident within these RF proximity chip cards have continued to improve with low power and the addition of cryptographical functions that now meet government "strong" encryption standards (DES, RSA, etc.) as standardized by Europay Mastercard and Visa (EMV) cryptographic and tamper-proof standards for crytoprocessor chips. As a result, the RF proximity chip cards are slowly replacing the magnetic stripe card for use in financial transactions, primarily due to the security of the magnetic stripe user data and the ability of the POS card acceptance system to "interrogate" the RF proximity chip card. The lower fraudulent transactions associated with such a smart card results in lower risk, and lower fees for the consumer and merchant.

Even more recently, the increased speed and reduced size of electronic devices has resulted in the proliferation of powerful and portable personal trusted devices, or PTDs. Mobile PTDs including the personal digital assistant (PDA) and cellular phone now number in the millions worldwide. The ability of these PTDs to communicate via cellular and wireless ISP networks has been augmented by their ability to exchange data over short ranges, typically 1 mm-10 meters, for purposes of secure data sharing between PTD devices and such peripheral devices as printers. These short-range networks are typically referred to as personal area networks (PAN). One predominant short-range RF communications network standard, defined by the International Electrical and Electronic Engineers association (IEEE), is known as the IEEE 802.11(b) standard, and includes such protocols as BLUETOOTH. Other RF communications protocols include but are not limited to IEEE 802.11(a) and 802.11(g). A major short-range infra-red (IR) communications network protocol, defined by the Infra-red Device Association (IrDA), is known as the IrDA standard and their present specification is IrDA v1.2.

The variety of functions available to PTDs is increasing rapidly, for example with remote banking being popularized via the internet and telephone ordering. Many merchants are now able to use mobile transaction processing systems with cellular wireless ISP networks providing bank access and such support functions as consumer authentication, transaction authorization, event logging, and settlement. Consumers are now able to access and effect personal account maintenance functions via bank websites and similar portals.

Despite this advancement, there remain 21 million worldwide merchants having only magnetic stripe card acceptance systems. Many of these merchants obtained their magnetic stripe card acceptance system years ago, and are resistant towards replacing their equipment and undergoing training in the use of newer systems. As a result, most new financial card equipment sales are merely replacement models. Upgrades to new equipment, including merchant systems capable of reading the RF proximity chip cards, is primarily driven by head offices of franchise or branch retail stores desiring to improve inventory, financial accounting, and similar functions, who may not necessarily exert influence over individual, independent merchants. Yet another barrier to adopting technology for RF proximity chip card transactions is that manufacturers of magnetic stripe card acceptance systems may disqualify any attempt to upgrade their devices through direct modification of electrical connections, thereby discouraging upgrades by third party equipment suppliers.

A problem thus exists whereby the technology for more secure consumer/user financial data storage and transactions is available, but is compromised by a reluctance of merchants to replace their existing POS card acceptance systems. Therefore, it can be seen that there is a need in the art for devices and methods which enable older legacy POS card acceptance systems to be non-invasively adapted to interact with various newer technology PTD devices to meet the desires of the transaction industry, and the desires of the merchants.

BRIEF SUMMARY OF THE INVENTION

An adaptor in accordance with the present invention allows a conventional magnetic stripe card POS reader to receive information from contact-based or wireless sources while maintaining the concurrent ability of the reader to interact with a magnetic stripe card. In accordance with one embodiment of the present invention, the adaptor includes an inductor capable of generating a magnetic field of sufficient strength to couple through the housing of the reader device, with a head of a magnetic stripe card reader. Selective inductive communication with individual heads of the reader device may exploit their differing sensitivity to external magnetic fields generated by the adaptor. In this manner, the adaptor can be positioned external to the reader device, leaving the slot of the reader accessible for conventional interactions with magnetic stripe cards.

An embodiment of an adaptor for a magnetic stripe card reader in accordance with the present invention, comprises, an inductor element configured to be positioned near a magnetic stripe card reader, the inductor element configured to generate a magnetic field of sufficient strength to penetrate the housing and activate a data recovery circuit in electronic communication with a head of the magnetic stripe card reader.

An embodiment of a method in accordance with the present invention for communicating with a reader head of a magnetic stripe reader device, the method comprises positioning a module comprising an inductor element proximate to a housing of a magnetic stripe reader device, and applying a current to the inductor element to generate a magnetic field of sufficient strength to penetrate the housing and be sensed by a head of the reader device.

An alternative embodiment of a method in accordance with the present invention for selectively communicating data to a reader head of a magnetic stripe reader device, comprises, positioning a first inductor and a second inductor proximate to a housing of a magnetic stripe reader device, causing the first inductor to generate a first magnetic field of intensity sufficient to penetrate the housing and be sensed by a more sensitive head of the reader device, and causing the second inductor to generate a second magnetic field of intensity sufficient to penetrate the housing and be sensed by a less sensitive head of the reader device.

A further understanding of the embodiments of the present invention can be made by way of reference to the ensuing detailed description taken in conjunction with the accompanying drawings.

DETAILED DESCRIPTION OF THE INVENTION

An adaptor in accordance with the present invention allows a conventional magnetic stripe card reader to interact with other media such as RF proximity chip cards and Infra-Red while retaining the continuous ability to receive a magnetic stripe card. In accordance with one embodiment, the adaptor includes an adaptor positioned external to, and affixed to the housing of, the conventional magnetic stripe card reader device. The adaptor includes elements configured to emit a localized magnetic field of sufficient strength to communicate a signal through the housing to the head of the magnetic stripe card reader.

Figure 1:
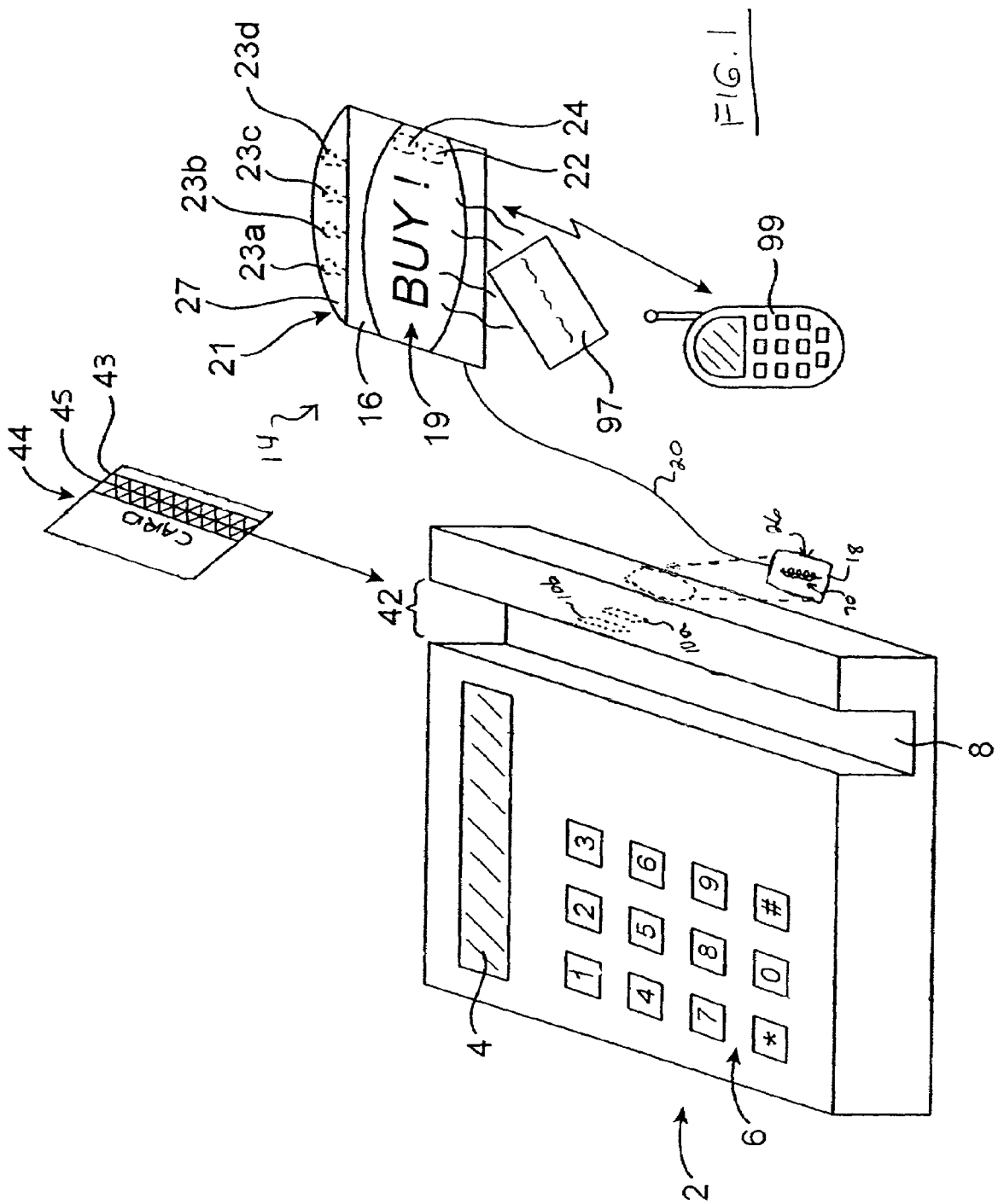
FIG. 1 shows a simplified schematic view of one embodiment of an adaptor system in accordance with the present invention.

FIG. 1 shows a simplified schematic view of an adaptor system in accordance with one embodiment of the present invention. Conventional point-of-sale (POS) magnetic stripe card reader 2 features display 4, keypad 6, and magnetic card swipe slot 8. First magneto-inductive reader head 10a is positioned to receive signals from Track One 43 of conventional magnetic stripe credit card 44. Second magento-inductive reader head 10b is positioned to receive signals from Track Two 45 of magnetic stripe credit card 44.

Adaptor 14 comprises consumer pod (C-Pod) portion 16 in electrical communication with merchant pod (M-Pod) portion 18 through cable 20. Consumer pod portion 16 is positioned at a location convenient for the customer, who may interact with the adaptor 14 by bringing an RF proximity chip card 97, PTD 99, or other RF or IR transceiver device in proximity to a wireless transceiver 22 to communicate information.

C-Pod portion 16 includes active region 19 proximate to an antenna for interacting at short range with an RF proximity chip card or other personal trusted device. Active region 19 may be of concave shape to cue a user as to the optimal position of the RF proximity chip card in front of the antenna. Particular embodiments of the C-Pod may bear an advertising logo on the active region 19 as generically indicated in FIG. 1. One possible design of a C-Pod structure in accordance with an embodiment of the present invention is depicted in U.S. design patent application no. 29/168,943, filed Oct. 10, 2002 which is incorporated by reference herein for all purposes.

C-Pod portion 16 may further include visual display region 21. In one embodiment, four discrete light emitting devices 23a-d are positioned behind translucent screen 27 of C-Pod portion 16 and then selectively lit to indicate progress of a particular transaction. For example, left-most lamp 23a may be continuously lit to indicate an active power connection. Lamps 23b and 23c may lit to indicate detection of the presence of an RF proximity chip card or other user device. Right-most lamp 23d may be lit to indicate completion of a successful transaction. Embodiments of C-pod portion 16 may also include apparatus for providing audio indicia of transaction progress, for example a speaker which emits a sound after successful completion of the transaction.

C-Pod portion 16 further comprises one or more transceivers 22 in communication with respective interface processors 24. One example of a transceiver which may be located in the consumer pod portion is an infrared (IR) transceiver supporting Irda v.1.2 and higher standards for inter-device bi-directional communications. This IR transceiver is of particular value for communicating with personal trusted devices (PTD) that may be carried by a consumer or user. Another example of a transceiver that may be located in the consumer pod portion is a radio frequency proximity transceiver conforming to the ISO 14443 type A or B standard or to the ISO 15693 standard. Still another example of a transceiver that may be located in the consumer pod portion is a transceiver conforming to the Bluetooth IEEE 802.11(b) standard, or the IEEE 802.11(a) and (g) standards. Yet another example of a transceiver that may be located in the C-Pod portion is a wireless transceiver configured for wireless or cellular protocols based upon CDMA, CDPD, GPRS, GSM, SMS and similar wireless communication protocols.

While the above description has focused on the presence of one or more wireless transceivers in the consumer pod portion of the adaptor, this is not required by the present invention. In alternative embodiments, the consumer pod portion could feature one or more contact-based interfaces for interacting with a consumer transaction card or smart card. One example of such a system is a modular-based docking port for a smart card. Other embodiments could include both wireless and contact-based transceivers.

In addition to the wireless or contact-based transceivers just described, an adapter in accordance with an embodiment of the present invention could further comprise one or more additional specialized interfaces. Examples of such additional interfaces include but are not limited to a keyboard permitting the entry of psychometric devices such as a personal identification number (PIN) pin pads, and SMS transfer of PIN, bio-metric devices such as finger print, iridology, voice print analyzers, driver's license identifications, or transconductance cards currently being developed, and devices for reading code sets such as bar codes, UPS-type 3-D codes, moiré-pattern codes, and drivers license magnetic strips and holograms, and SIM/WIM/UIM subscription identifier chips typically used in cellular PTD devices. One or more of these interfaces, alone or in combination, could require additional verification or authentication of the user, thereby adding levels of security to the transaction.

As shown in FIG. 1, consumer pod portion 16 is in electrical communication with merchant pod portion 18 through cable 20, although in other possible embodiments the consumer pod and merchant pod could communicate according to infrared or another medium. Merchant pod 18 comprises module 26, affixed to the external housing of the reader device. Module 26 encloses magnetic field-generating element 70 aligned with Track 1 reader head 10a and Track 2 reader head 10b of device 2. Merchant pod 18 may be affixed to the reader device by any one of a variety of approaches, including adhesive glue or tape.

Figure 2:
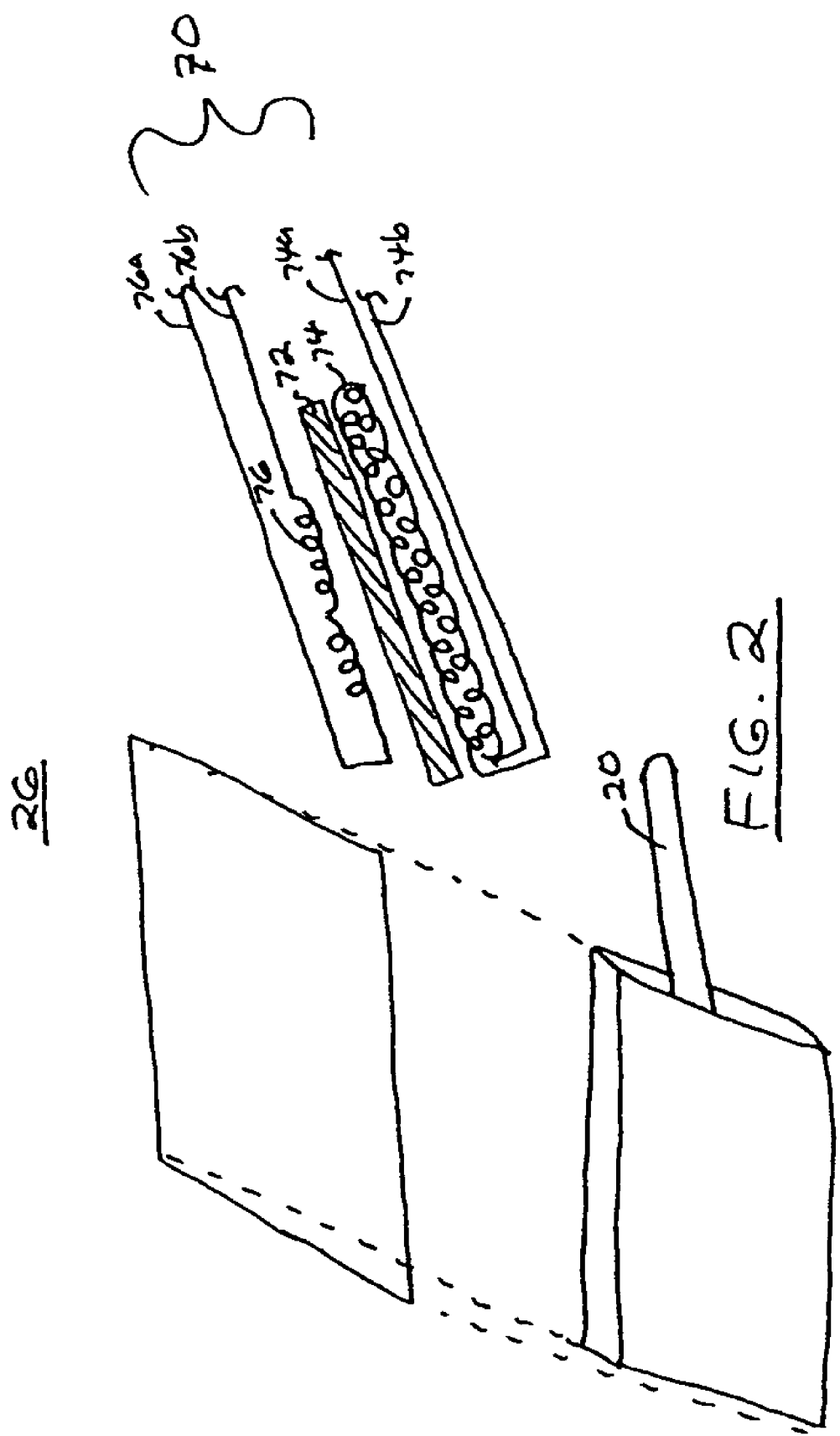
FIG. 2 shows a simplified exploded view of an inductor module for attachment to the external housing of the reader device.

FIG. 2 shows a simplified exploded view of module 26 of M-pod 18. FIG. 2 shows that the magnetic field-generating element 70 comprises a Ferrite core 72 encircled within separate inner coil 74 and outer coil 76, having first and second ends 74a-b and 76a-b respectively. First ends 74a and 76a are housed within cable 20 and communicate with Track two terminals of power source(s). Second ends 74b and 76b are housed within cable 20 and communicate with Track one terminals of a power source(s).

In the specific embodiment shown in FIG. 2, core 72 comprises a ferrite rod having a thickness of about ⅛" and a length of about 1". Inner coil 74 comprises 30 gauge copper wire with a winding of about 80 turns/inch. Inner coil 74 is wound twice over the full length of the rod. Outer coil 76 also comprises 30 gauge copper wire with a winding of about 80 turns/inch. As shown in FIG. 2, inner coil is wound from the center of rod half-way to either end. Due to the increased number of windings of inner coil 74, application of the same amount of current to inner coil 74 will produce a magnetic field of greater intensity than the field produced by outer coil 76.

During operation, the adapter exploits a number of features of the conventional magnetic stripe card reader to selectively communicate with the data recovery circuits of the different reader heads. First, the heads of a conventional magnetic stripe reader are configured to operate asynchronously, triggered by receipt of initial strobe information. Second, the heads of the conventional magnetic stripe card reader exhibit a differing sensitivity to an external magnetic field. This combination of features may be relied upon by the adapter to communicate with the reader head as follows.

The following discussion of operation of the adaptor according to embodiments of the present invention relies upon information taken from the ISO standard 7811, which is incorporated herein by reference for all purposes.

As mentioned above, the data recovery circuits of both the Track 1 and Track 2 reader heads are configured to expect transmission of the continuous data package based upon receipt of a predetermined number of leading signals, or strobes. Initially, the flow of current through the inner coil of the adaptor generates a magnetic field conforming to such a strobe pattern, thereby priming the reader device to expect an incoming data signal. The timing of the strobe pattern falls within the velocity range of the signal expected to be received from a magnetic stripe card being swiped through the magnetic stripe card slot.

The two data recovery circuits, for Track 1 and Track 2, exhibit different sensitivities to an applied magnetic field. The card account number data stored on Track 2 of the magnetic stripe card is referenced in almost all transactions. By contrast, the user identification data stored on Track 1 is considered less essential, and is not referenced for all transactions. Accordingly, the Track 1 reader head 10b is typically configured to detect an external magnetic field approximately 20 db more sensitive than the Track 2 reader head. The typical lower sensitivity of the Track 2 head ensures that recovered Track 2 data exhibits a high signal to noise ratio and thus greater accuracy, and correlates to a minimum velocity of the magnetic card slid past the heads.

Moreover, §9.2 of ISO specification 7811-2 indicates that the Track 1 data recovery circuit is configured to receive data having a density of 8.27 bits/mm (210 bits per inch), while the Track 2 data recovery circuit is configured to receive data having a density of only 2.95 bits/mm (75 bits per inch). Since Track 1 and Track 2 have different data rates, their recovery circuits are typically asynchronous in nature. In particular, Track 1 and Track 2 recover their own individual clock and data, and typically share a common card read strobe.

Embodiments of adaptors in accordance with the present invention exploit the asynchronous nature of the Track 1 and Track 2 data recovery circuits, together with differing characteristics between them, in order to selectively communicate with the two reader heads. In accordance with one embodiment of the present invention, a different sensitivity of Track 1 and Track 2 to an external applied magnetic fields may be used to accomplish such selective communication.

Figure 3B:
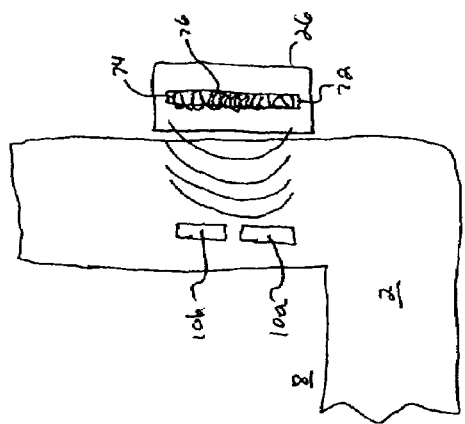
FIG. 3B shows a simplified cross-sectional view of the system of FIG. 3A.
Figure 3A:
FIG. 3A shows a perspective photographic view of one type of conventional magnetic stripe card reader equipped with an inductor module in accordance with the present invention.

FIG. 3A shows a perspective photographic view of a conventional reader device having heads positioned on the side of the slot distal from the keypad, equipped with an inductor module in accordance with an embodiment of the present invention. FIG. 3B shows a simplified cross-sectional view of the system of FIG. 3A.

During operation of the adaptor, when communication is desired with the magnetic head(s) of the reader device, a first current is initially flowed through outer coil 76. As a result of this first current flow, inductor element 72 generates a magnetic field. This magnetic field is sufficiently powerful to activate the card present circuit (i.e. provide the expected strobes) and communicate with the more sensitive data recovery circuit (typically of the Track 1 head). However, this magnetic field is not sufficiently powerful to communicate with the less sensitive data recovery circuit (typically of the Track 2 head).

Once module 26 has successfully communicated with Track 1 head 10b, the flow of current to through outer coil 76 is halted. With no interruption in transmitted data signals, a current is then flowed through inner coil 74.

As a result of this current flow through inner coil 74, a magnetic field recognizable by the Track 2 data recovery circuit is generated. Typically, the greater number of windings of inner coil 74 result in generation of a more powerful magnetic field, which activates the less sensitive data recovery circuit of the Track 2 head.

The more powerful field emitted by the inner coil serves to activate both Track 1 and Track 2 data recovery circuits. However because communication to the Track 1 circuit has earlier been initiated and completed, this subsequent communication to the Track 1 circuit is ignored by the POS, and the Track 2 data communication is received to complete the packet of continuous data.

The embodiment of the communication method just described initially generates an less powerful field to communicate with the more sensitive reader head, and then generates a more powerful field to communicate with the less sensitive reader head. However, embodiments of the present invention are not limited to this particular approach. In accordance with alternative embodiments, a magnetic reader device may be configured to first recognize and read the more important Track 2 information, and only then receive and process the less important Track 1 information. Selective communication with multiple heads of such a reader device could be accomplished by initially generating a more powerful field to communicate with both of the heads, the device configured to initially receive only Track 2 data sent to the less sensitive head. Thereafter, a less powerful field could be generated to allow only the more sensitive head to receive a second portion of a continuous data packet corresponding to Track 1 information.

An adaptor in accordance with an embodiment of the present invention may be configured to be attached to the housing of any type of conventional magnetic stripe card readers. Examples of known POS magnetic stripe card readers to which a plate may be created to facilitate contact include, but are not limited to, the TRANZ and OMNI systems of VeriFone, Inc. of Santa Clara, Calif., the T7, T8, and ICE systems of Hypercom Corporation of Phoenix, Ariz., the NURIT 2085 and 2080 systems of Lipman Electronic Engineering Ltd. of Tel Aviv, Israel, the SUREONE and SUREPOS systems of International Business Machines Corp. of Armonk, N.Y., the ELITE system of INGENICO of Cedex, France, the MAGIC system of SchlumbergerSema of New York, N.Y., the 8000 series of INTELLECT of Brussels, Belgium, and the PAYWARE system of the Trintech Group Plc. of Dublin, Ireland.

While the above description has focused on the presence of separate and discreet consumer pod and merchant pods with interconnecting cable, this configuration is not required by the present invention. In alternative embodiments, the consumer pod portion could be integrated into the merchant pod portion, creating a complete and single-piece unit. One example of such a system preference would be for merchants with magnetic POS reader systems conveniently located on the transaction counter and within reach of the consumer's PTD. Alternate embodiments could include positioning the separate M-Pod and C-pod components remote from the module that is in magnetic communication with one or more heads of the card acceptance system reader. Another alternate embodiment could include the positioning of a single piece integrated C-Pod and M-Pod device remote from the module that is in magnetic communication with one or more heads of the card acceptance system reader.

The embodiment shown in FIGS. 1 and 3A-B depict a conventional magnetic stripe card reader bearing an adaptor positioned as described above. However, other types of magnetic stripe card reader devices feature magnetic reader heads positioned at different locations within the reader device.

Figure 4B:
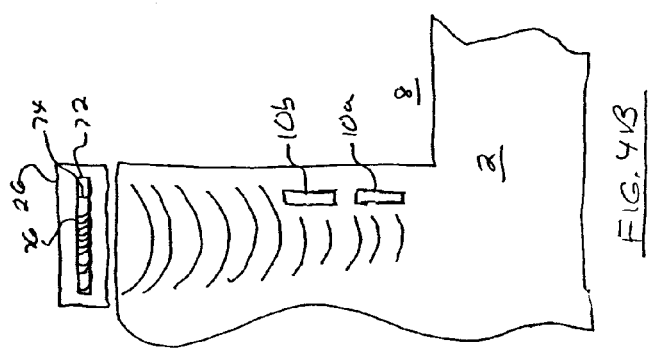
FIG. 4B shows a simplified cross-sectional view of the system of FIG. 4A.
Figure 4A:
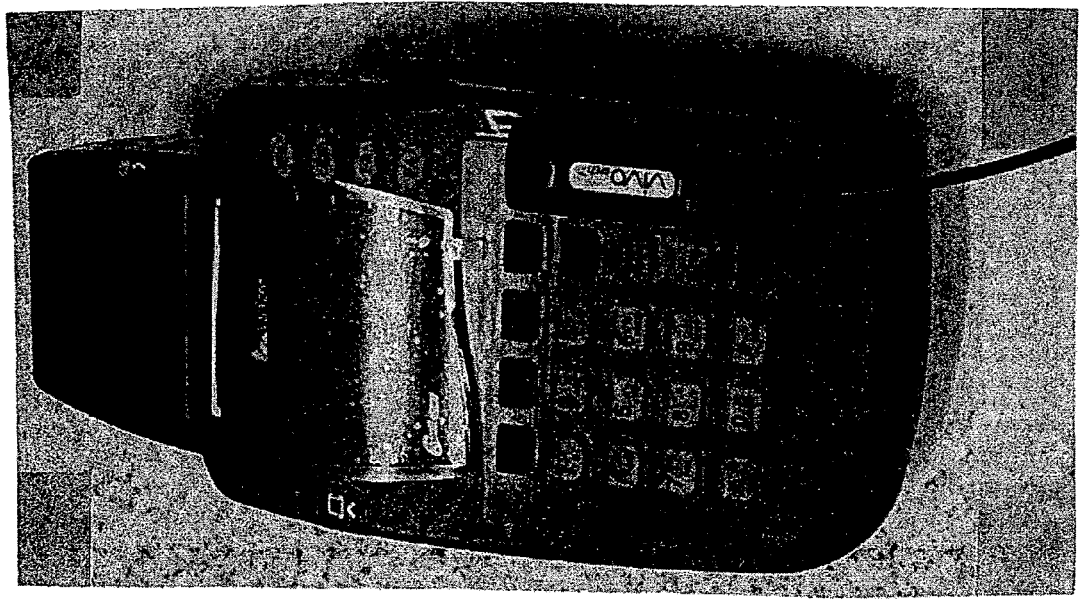
FIG. 4A shows a perspective photographic view of another type of conventional magnetic stripe card reader equipped with an inductor module in accordance with the present invention.

Accordingly, FIGS. 4A-B show perspective and cross-sectional views, respectively, of an embodiment of a system in accordance with the present invention wherein the heads of the magnetic stripe card reader device are positioned on the same side of the slot as the keypad. Accordingly, module 26 is positioned on the external housing next to the keyboard, aligned to overlie the reader heads. Apart from the difference in spatial orientation of the inductor relative to the two reader heads, operation of this adapter embodiment is fundamentally the same as with the device shown in FIGS. 3A-B.

An inductor structure of an adapter in accordance with embodiments of the present invention would be expected to generate a magnetic field having sufficient intensity to couple with the magnetic reader head across the thickness of the housing. However, the magnetic field produced by the inductor structure should not be so strong as to saturate the head, cause inter-track noise, or cause unwanted coupling with other components of the POS equipment. Thus in particular embodiments, the inductor element would be expected to operate to generate a magnetic field having an intensity received at the reader head(s), equivalent to emulate magnetic card domains falling within the specified range for magnetic stripe cards.

While the above description has focused upon an inductor element configured to generate magnetic fields of different strengths according to a number of windings of a wire coil, this is not required by the present invention. In accordance with alternative embodiments, magnetic fields of different strengths could be generated by an inductor element utilizing currents of different magnitudes, and/or utilizing core materials having a different size or ferromagnetic character.

And while the above description has focused upon selective communication with different reader heads based upon their differing sensitivity to external magnetic fields, this is also not required by the present invention. In accordance with alternative embodiments, characteristics other than sensitivity of a magnetic head to an applied magnetic field could be exploited to provide selective communication. The following TABLE summarizes a number of differences of attributes of TRACKS 1 and 2.

TABLE

| ATTRIBUTE | TRACK 1 | TRACK 2 |
|---|---|---|
| data packet size (bits) | 7 | 5 |
| data packet content | alphanumeric | numeric |
| maximum number of characters | 79 | 40 |
| bit density (bits/mm) | 8.27 | 2.95 |
| maximum distance from card to lower edge of track (mm) | 5.79 | 9.09 |

In light of the above TABLE, alternative embodiments of an adaptor in accordance with the present invention could recognize and exploit some of these attributes of the reader heads configured to read these tracks in order to accomplish selective communication.

Given the above detailed description of the present invention and the variety of embodiments described therein, these equivalents and alternatives along with the understood obvious changes and modifications are intended to be included within the scope of the present invention.

What is claimed is:

1. An adaptor for a magnetic stripe card reader comprises an inductor element comprising a rod of ferromagnetic material comprising ferrite encircled within a conductive coil, the inductor element configured to be positioned near a magnetic stripe card reader, and configured to generate a magnetic field of sufficient strength to penetrate a housing of the magnetic stripe card reader and activate a data recovery circuit in electronic communication with a head of the magnetic stripe card reader, wherein the magnetic stripe card reader further comprises a second magnetic head, the adapter further comprising a second conductive coil, and wherein the second magnetic reader head exhibits reduced sensitivity to an applied magnetic field than the magnetic head.

2. The adaptor of claim 1 wherein the second conductive coil exhibits a fewer number of windings than the conductive coil.

3. The adaptor of claim 1 configured to be mounted against a side of the magnetic stripe card reader.

4. The adaptor of claim 1 configured to be mounted on a top of the magnetic stripe card reader.

* * * * *